Oct. 29, 1929.                G. A. ARNOLD                1,733,931
                            LUBRICATING BEARING
                        Original Filed Aug. 23, 1922
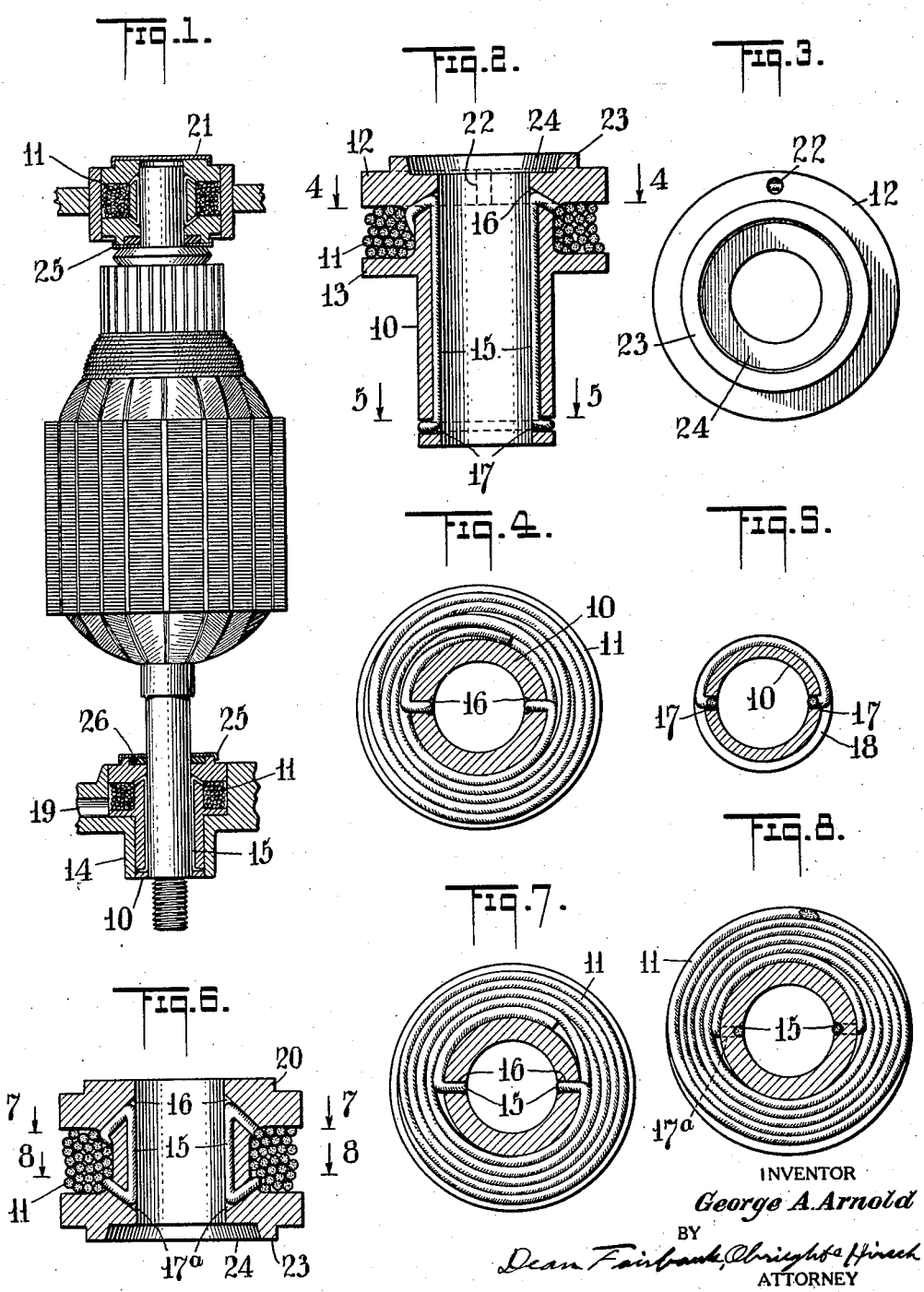
INVENTOR
George A. Arnold
BY
Dean Fairbank, Obright & Hirsch
ATTORNEY Patented Oct. 29, 1929

1,733,931

UNITED STATES PATENT OFFICE

GEORGE A. ARNOLD, OF NEWARK, NEW JERSEY, ASSIGNOR TO GOODELL-PRATT COMPANY, OF GREENFIELD, MASSACHUSETTS, A CORPORATION OF MASSACHUSETTS

LUBRICATING BEARING

Original application filed August 23, 1922, Serial No. 583,714. Divided and this application filed April 26, 1928. Serial No. 272,914.

This application is a division of my prior and copending application, Serial No. 583,714, filed August 23, 1922, for drills.

The present invention is an improvement in lubricating bearings, and although applicable for the rotating parts of various types of machines, it is particularly applicable to the armature shaft of an electric motor such as is used in electric drills and other analogous tools.

As the essential feature of my invention I provide the bearing member with an annular oil storage chamber which retains the oil by reason of wicking wound therein. The bearing member is also provided with a longitudinal groove in its bearing surface, and the groove communicates with the annular encircling chamber and contains a section of the wicking so that the oil may be conducted by capillary attraction from the chamber to the surface of the shaft along a considerable portion of the length of the latter.

As one important feature the groove and annular chamber are so connected that both ends of the wicking are secured in the annular chamber, while an intermediate portion extends along the groove. The wicking may thus be threaded through apertures into the groove, and the ends then wound around the bearing to form the main body of the wicking in the annular encircling chamber.

In the accompanying drawings there are illustrated two embodiments of my invention. In these drawings:

Fig. 1 is a central longitudinal section through a pair of bearings illustrated as supporting the armature of an electric motor.

Fig. 2 is an enlarged section of the lower bearing shown in Fig. 1.

Fig. 3 is a top plan view of the bearing shown in Fig. 2.

Figs. 4 and 5 are transverse sections on the lines 4—4 and 5—5 respectively of Fig. 2.

Fig. 6 is an enlarged section of the upper bearing, and

Figs. 7 and 8 are transverse sections on the lines 7—7 and 8—8 respectively of Fig. 6.

Although in some constructions the same type of bearing may be used on opposite ends of the shaft, it is preferable that the longer bearing be provided at the end of the shaft where there is the maximum side thrust, and thus need for lubrication.

The shaft illustrated is the armature shaft of the electric motor illustrated in my prior application, Serial No. 583,714, although the invention is not in any way limited to this particular type of shaft or the use to which it is put.

The lower bearing as illustrated includes a sleeve or bushing 10 having an annular chamber 11 encircling the same adjacent to the upper end, and formed between a pair of annular flanges 12 and 13. Below the lower flange 13 the bearing member may comprise a comparatively thin sleeve which may be supported in a frame member 14, while the flanges and chamber 11 fit into a socket in said frame member so that the frame member forms an outer or peripheral wall to the chamber. The inner surface of the sleeve is provided with a pair of longitudinally extending grooves of such diameter as is suitable for receiving strips of wicking. These grooves do not extend to the ends of the bearing member, but terminate at apertures 16 at the upper end and 17 at the lower end. These apertures extend substantially radially and the apertures 16 communicate with the chamber 11. The lower end portion of the bearing member has an annular groove 18 in the outer surface thereof, into which the apertures 17 extend.

In providing the bearing member with wicking, one end of the wicking is wound for a few turns in the annular chamber 11, thence extended through one of the apertures 16, laid along the groove 15 to the corresponding aperture 17 at the other end, and thence to the exterior of the bearing member. Here it is wound half way around the outside of the bearing member, as shown in Fig. 5, and projected in through the other aperture 17 to the other groove 15. It is then led along this last mentioned groove to the other aperture 16, and then out through the other aperture 16 to the chamber 11. This outer end is then wound enough times in the chamber and around the bearing member to provide the desired volume of wicking in the chamber, which may, if desired, substantially fill said chamber. The wicking may thus act by capillary attraction to retain the main body of oil in the chamber so as to keep it from draining out if the apparatus be turned to various different positions in use, and at the same time the wicking will conduct by capillary attraction the necessary amount of oil to the lengths of wicking in the grooves 15 to keep the shaft properly lubricated. Both ends of the wicking are securely retained in the chamber 11 so that there is no liability of the portion of wicking in the groove 15 becoming loose at either end or being drawn or wedged between the bearing and the shaft. The frame member may be provided with any suitable oil hole such as a passage 19 in the frame member.

The bearing which is employed for the upper end of the shaft may be similar to that above described, although preferably it is somewhat shorter and the wicking from both ends of the center longitudinal groove extends to the chamber. The chamber 11, grooves 15 and apertures 16 may be the same as those above described, but the lower apertures 17ᵃ may extend directly to the chamber 11. This bearing member may have an annular shoulder 20 which will frictionally receive a cap 21 to close the end of the bearing against the admission of any dust or dirt to the interior of the bearing. The bearing shown in Figs. 6, 7 and 8 is wound by first applying a few turns of wicking to the chamber 11, then applying the wicking to one of the grooves 15, then giving a half turn to the wicking to the opposite side and applying the wicking in the other groove. The remaining end of the wicking is then wound in the chamber to give the desired quantity of absorbent retainer for the oil. The oil may be delivered to this chamber by any suitable oil hole, for instance the hole 22 in the top flange 12.

To prevent the oil of the bearings from leaking or seeping to the armature and commutator of the motor, each of the sleeves or bushings is provided with a flange 23 at the inner end thereof which encircles a chamber 24 receiving a felt washer 25. This washer is held in place by an annular cover 26 encircling the shaft and provided with a peripheral flange which telescopes friction tight on the flange 23.

Having thus described my invention, what I claim as new and desire to secure by Letters Patent is:

1. A bearing member for shafts, including a body portion having an annular groove in the periphery thereof constituting an oil storage chamber, a longitudinal groove upon the inner surface of the body portion, an opening connecting said grooves at one end of the second mentioned groove, and wicking having an intermediate portion extending lengthwise of said second mentioned groove and the terminal portions wound around the body portion in said first mentioned groove and substantially filling said oil storage chamber.

2. In combination, a frame member having an aperture therein, a bushing disposed within said aperture and having a peripheral groove closed at its outer side by said frame member to form an annular oil chamber, said bushing having a shaft supporting opening therethrough a longitudinal groove within said opening and substantially radial apertures communicating with opposite ends of said groove, and wicking having an intermediate portion extending along said longitudinal groove and projecting out through both of said apertures, both of the terminal portions of said wicking being wound around said bushing within said groove to form a body of oil-retaining material.

3. As an article of manufacture a bushing for use in supporting a shaft, and including a body portion having an annular chamber on the periphery thereof, a longitudinal groove upon the inner surface, and a wicking having an intermediate portion extending along said groove, and both of its ends wound around said bushing in said annular chamber to form a body of oil retaining material.

4. A bushing having a longitudinal groove upon the inner surface, an annular groove upon the periphery, radial apertures communicating with the ends of said longitudinal groove, the apertures at at least one end of said longitudinal groove communicating with said annular groove, and wicking lying along said longitudinal groove and extending through said apertures, and having both terminal portions wound around the bushing to substantially fill said annular groove.

5. As an article of manufacture, a bushing for use in supporting a shaft, and including a body portion having an annular chamber on the periphery thereof, a longitudinal groove upon the inner surface, a wicking having an intermediate portion extending along said groove, and both of its ends wound around said bushing to substantially fill said annular chamber and serve as a body of oil retaining material, an annular flange on one end, a cover having its periphery telescoping with said flange, and a washer retained within said flange and beneath said cover.

Signed at Newark, in the county of Essex, and State of New Jersey, this 24th day of April, 1928.

GEORGE A. ARNOLD.